March 9, 1965    H. G. DE WINTER    3,173,012
TELESCOPE SYSTEM FOR SIMULTANEOUSLY VIEWING TWO SUPERPOSED
IMAGES OF THE SAME OBJECT AT DIFFERENT MAGNIFICATIONS
Filed Dec. 18, 1962

HERMANUS GERHARDUS DE WINTER
INVENTOR

BY
DEAN, FAIRBANK & HIRSCH
ATTORNEYS

United States Patent Office 3,173,012
Patented Mar. 9, 1965

3,173,012
TELESCOPE SYSTEM FOR SIMULTANEOUSLY VIEWING TWO SUPERPOSED IMAGES OF THE SAME OBJECT AT DIFFERENT MAGNIFICATIONS
Hermanus Gerhardus de Winter, Delfgauw, Netherlands, assignor to N.V. Optische Industrie "De Oude Delft," a corporation of the Netherlands
Filed Dec. 18, 1962, Ser. No. 245,535
Claims priority, application Netherlands, Dec. 22, 1961, 272,894
6 Claims. (Cl. 250—83.3)

The invention relates to telescopes and, more specifically, to telescope systems of simultaneously viewing two superimposed images of a same object at different magnifications. Such systems through which an observer sees a double image of an object, i.e. one at low magnification and with a large part of the scene surrounding the object and one at a high magnification with a correspondingly reduced part of the scene, are useful for certain sighting purposes, such as for observing a guided missile on its flight to a target, as will be more fully explained hereinafter.

Telescoping systems for this purpose usually have two optical objective systems of different focal length which by the aid of some optical combining means project their images onto a common focal plane and are used with a common ocular or some other means for making the two superimposed images visible to the observer.

Some existing types of double telescopes for this purpose show certain limitations as regards their optical abilities such as the ratio of magnifications or the light efficiency that can be readily achieved.

It is accordingly a principal object of my invention to provide a telescope system which avoids these and other limitations of and objections to prior art devices of this type.

It is another object of my invention to provide a telescope system of the above type of such construction as to permit a relatively high magnification ratio to be readily achieved.

It is a further object to avoid, in double telescopes of the type referred to, the use of beam combining means causing light losses, such as semi-transparent mirrors.

Still another object is to provide double telescope system in which the objective system having the longer focal length can readily be made to have a higher light gathering power than the objective system having the shorter focal length.

A further object is to provide for a coaxial arrangement of the two objective systems in a double telescope of the above type in which the two systems do not interfere in each other's optical functions.

Though the invention is by no means limited thereto, and evidently can have many useful applications in purely optical telescopes, it will be described hereinafter with special reference to infra-red telescopes, i.e. telescopes permitting the observation of objects which are significant sources of infra-red radiation or reflect infra-red rays with which they are illuminated. Telescopes for this purpose have an electronic image converter tube on whose photocathode an infra-red image of the object is focused and which on their anode screen reproduce that image in visible form. Usually, an optical magnifier is provided which enables the observer to view the image at a convenient magnification.

Accordingly, it is a further object of my invention to provide an infra-red telescope system in which superposed infra-red images of different magnifications are focused on the photocathode of a single image converter tube.

Another object is to provide an infra-red double telescope in which the image having the largest magnification has an average brightness substantially higher than the image with the lower magnification.

Briefly, the invention provides two objective systems which are coaxially disposed. The objective system having the longer focal length is a mirror system of relatively large diameter comprising a concave mirror as the principal image forming element and a secondary mirror which reflects the light received from the primary mirror towards the focal plane. The second objective system is a lens system which projects its imaging rays through a central hole in the secondary mirror onto the same focal plane and its image, though covering substantially the same area as the image of the mirror system, represents a much wider field, due to its much shorter focal length. The two superimposed images may be viewed through an ocular and means such as a conventional prism set may be provided for reversing the images, if desired. Alternatively, an image converter may be inserted which transforms the infrared images into visible ones and at the same time reverses them so that the scene appears upright to the observer.

If used for tracking an object moving from a point beside but relatively close to the observer towards a distant target, the telescope is directed so that the target is within the limited field of view of the objective having the larger focal length or, preferably, is in that point of the field in which the two images coincide. First, the object will appear at low magnification at the edge of the image viewed by the observer and can be tracked for some time on its way towards the target. When the object is approaching the target the longer distance no longer permits a precise observation of the object and the area surrounding the target. Then (however, the object will also enter the field of the long focal length objective and from that time on, will appear twice in the image seen, viz. once at low magnification near the center and once at high magnification near the edge. Consequently, motion of the object relative to the target can be observed closely also during the last part of the flight.

If used as an infra-red telescope it is desirable that the luminosity of the long focal length objective substantially exceeds that of the short focal length objective. The apparent brightness of objects which are illuminated by a source of radiation near the observer will strongly decrease with increasing distance. The long focal length objective will become active only after the object to be tracked has approached the target. If this objective has a large relative aperture a sufficiently luminous image can nevertheless be achieved. On the other hand, the smaller relative aperture of the short focal length objective prevents the photocathode from being excessively exposed by radiation from the object as it is near to the observer. By relative aperture, the quantity $D/f$ is meant, in which D stands for the diameter of the entrance pupil and $f$ for the equivalent focal length of the system. Similar considerations apply to the case of objects which are infra-red sources themselves. An additional advantage resides in the fact that the objective of short focal length which has to track the object during the greater part of its path has a greater depth of field than the other objective.

The above and other objects and features of the invention will be more readily understood when reading the following description of a preferred embodiment thereof as shown in the drawing in which:

FIGS. 2 and 3 are diagrams of images, as seen through the telescope;

FIG. 4 is a diagram used in explaining the operation of the system.

Figure 1:
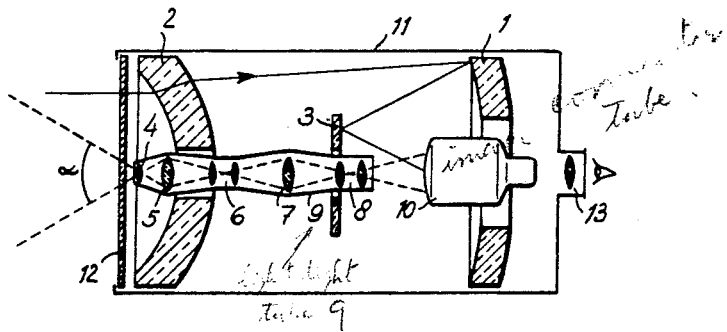
FIG. 1 is a diagrammatic longitudinal sectional view of a double telescope system.

In FIG. 1, the objective system of relatively long focal length is seen to be a catadioptric system, consisting of a concave spherical primary mirror 1, a meniscus correction lens 2 at a considerable distance from mirror 1, and a plane secondary mirror 3 which reflects the rays traveling from mirrow 1 to the focal plane, all of these elements being aligned on the optical axis (not shown). The objective system of short focal longth is coaxial with the mirror system and has the same focal plane. It consists of a first objective 4, followed by a train of further lenses 5, 6, 7 and 8, of which 5 and 7 are field lenses and 6 and 8 are symmetrical objectives used at a magnification of unity. The field lenses 5 and 7 are positioned at or near the image planes of the objectives 4 and 6, respectively. It will be seen that, optically, the whole system 4–8 is equivalent to a single objective having the same focal length and field of view as the objective 4 and which would be located at a distance equal to that focal length from the focal plane of the large objective system 1–3.

The lens system 4 to 8 inclusive is housed in a light-tight tube 9 which extends through central apertures of the meniscus lens 2 and the plane mirror 3. Since the central part of the beam entering the larger objective, as in all centered mirror objectives, is intercepted by the mirror 3 and therefore does not contribute to the image, no substantial light less is caused by the lens train 4–8.

The image formed by the lens system 4–8 on the photocathode of an image converter 10 corresponds to a relatively large field angle α of e.g. 50°. The field angle β covered by the image formed by the mirror system on the same photocathode, however, is very much smaller and may be, for example, 10°. As both images occupy substantially the same area, the ratio of the magnification is, in this case, 1:5. It will be appreciated that much higher ratios are readily possible, if desired, since the focal lengths of the mirror system 1–3 and the objective 4 may be independently chosen and a suitable lens train similar to that shown may be designed to bridge the gap between the focal plane of the objective 4 and the photocathode of the image converter 10. Between the first objective 4 and the last objective 8 of the lens train, instead of the lenses 5, 6 and 7, as shown, a compact bundle of thin light conducting fibers may be inserted to transport the image. It will be understood furthermore, that in order to achieve a high ratio of magnifications the use of a lens train such as 5–8 or an equivalent combination of lenses and a fiber bundle is indispensable since otherwise the objective 5 would have to be placed far behind the lens 2 and the latter lens would obstruct a considerable part of the wide field of objective 4.

The use of only two objective lenses and one field lens of fiber bundle in the lens train is prefectly feasible on the condition that in the path of rays a suitable image reversing means such as a set of prisms is provided to ensure that both the images on the photocathode have the same position.

The relative aperture of the large mirror objective is preferably substantially larger than that of the lens system 4–8, to compensate for the diminishing brightness of the object at larger distance. This is somewhat remarkable as it means that the diameter of the larger objective should be so selected as to more than compensate for the larger focal length of this objective. In a preferred embodiment as shown the relative apertures may be 1/1 for the large and 1/4 for the small objective. Given a focal length ratio of 5:1, this means that the stop diameter of the objective 1–3 should exceed that of objective 4 by a factor not less than 20.

The whole system is enclosed in a cylindrical housing 11 which at its front is closed by an entrance window 12, e.g., in the form of an infra-red filter, and has in its rear wall a conventional magnifier 13 for observing the anode screen of the image converter at the desired magnification. In some applications it is preferred to select a magnifier 13 such that the over-all angular magnification of the system for the wide field image is equal to unity.

It will be clear that the observer through the magnifier 13 will see two superposed images which are both centered on the point of the scene lying on the extended optical axis of the telescope. The telescope may be provided with a suitable measuring mark such as a pair of cross-wires optically projected onto the photocathode of the image converter and which may facilitate the pointing of the telescope on a target.

Figures 3, 4:
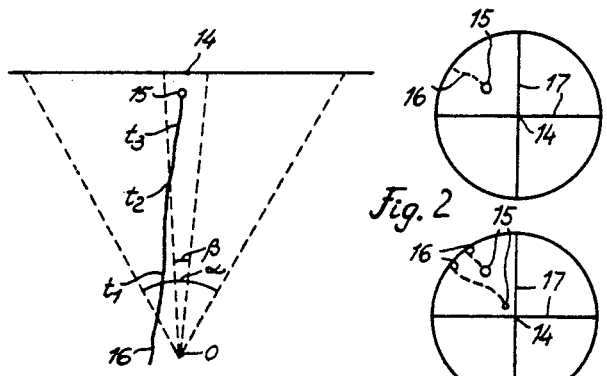

If, in operation, an object is tracked which moves from a place a small distance beside the observer towards the target, then the images diagrammatically shown in FIGS. 2 and 3 will be successively seen. In these figures, 14 is the target, 15 the moving object, 16 the path of the object and 17 a pair of crossed wires.

The diagram of FIG. 4 illustrates the situation. It shows at O the observer who has the telescope pointed to the target 14. The angles α and β give the field angles of the two objectives. The path of the object 15 is again indicated as 16. Initially at the time $t1$ (FIG. 2), the object is visible only in the large field of the objective system having the shorter focal length. At the time $t2$, however, it also enters the field β of the large objective and is imaged by the latter objective at a higher magnification (time $t3$, FIG. 3). Accordingly, during the last part of its flight the object can also be tracked with high accuracy, without any switching or other action being required on the side of the operation.

It will be appreciated that the telescope system shown has significant advantages. As the lens train 4–8 is coaxial with the mirror objective, parallaxe between the two images is avoided. This position incurs no light loss for the large system, however, since the lens system is fully within the central shadow caused by the secondary mirror. The wide field of the short focal length system is neither obstructed by the large objective. No semitransparent mirrors or similar means incurring light losses must be used in order to combine the two images. The mirror system is particularly adapted to the combination of long focal length and high luminosity required for the objective having the longer focal length.

I claim:

1. A telescope system for simultaneously viewing two superposed images of a same object at different magnifications, said system comprising first and second optical objective systems having a common focal plane and forming superposed images in said focal plane and means for viewing said superposed images, said first objective system being catadioptric and comprising in optical alignment a concave primary mirror, a secondary mirror in front of and facing said primary mirror and having a central aperture, and refractive aberration correcting lens means air spaced from said primary mirror, said second optical objective system being dioptric and comprising in axial alignment with said catadioptric system, a first objective lens, located a distance in front of said common focal plane longer than the focal length of said first objective lens, and means including at least one further objective lens to project an image of the focal plane of said first objective lens onto said common focal plane, said dioptric system extending through said central aperture of said secondary mirror.

2. A telescope system for simultaneously viewing two superposed images of a same object at magnification differing by a factor of at least 4, comprising first and second optical objective systems having a common optical axis and a common focal plane but differing in focal length by said factor, and means for viewing superposed images formed by said first and second optical objective systems in said common focal plane, said first optical objective system having the longer focal length being catadioptric and comprising in optical alignment a concave primary mirror of relatively large diameter, a secondary mirror in front of and facing said primary mirror so as to reflect light rays traveling from said primary mirror to said common focal plane, said secondary mirror having a central aperture, and refractive aberration correcting lens means axially air spaced from said primary mirror so as to be traversed by light rays before impingement on said primary mirror, said second optical objective system having the shorter focal length being dioptric and comprising, in axial alignment with said catadioptric system, a first objective lens located a distance in front of said common focal plane longer than the focal length of said first objective lens, means between said first objective lens and said common focal plane to project an image of the focal plane of said first objective lens onto said common focal plane, said last means having field lens means and a second objective lens between said field lens means and said common focal plane, and image reversing means for reversing the image formed by said second objective system on said common focal plane, said second objective system extending through said aperture in said secondary mirror and having a diameter which is small relative to the diameter of said primary mirror.

3. A telescope system as claimed in claim 2 wherein said reversing means comprises a third objective lens and second field lens means between said first field lens means and said second objective lens.

4. A telescope system for simultaneously viewing two superposed images of a same object at magnifications differing by a factor of at least 4, comprising first and second optical objective systems having a common optical axis and a common focal plane, and means for viewing superposed images formed by said first and second objective systems in said common focal plane, said first optical objective system having the longer focal length being catadioptric and comprising, in axial alignment, a concave spherical primary mirror of relatively large diameter, having a central aperture, a secondary mirror in front of and facing said primary mirror so as to reflect light rays traveling from said primary mirror to said common focal plane, said secondary mirror likewise having a central aperture, and a refractive spherical aberration correcting meniscus lens of weak negative power, having its convex surface facing said primary mirror, said meniscus lens being located at the side of said secondary mirror remote from said primary mirror so as to refract light rays prior to their impingement on said primary mirror, said meniscus lens having likewise a central aperture, said second optical objective system having the shorter focal length being dioptric and comprising, in axial alignment with said catadioptric system, a first objective lens located a distance in front of said common focal plane substantially longer than the focal length of said first objective lens, a second objective lens forming an image of the focal plane of said first objective at a magnification substantially equal to unity, a first field lens between said first and second objective lenses, a third objective lens forming an image of the image plane of said second objective lens in said common focal plane at a magnification likewise substantially equal to unity, and a second field lens between said second and third objective lenses, said telescope system further comprising a tubular housing for said dioptric system extending through said aperture in said secondary mirror and said meniscus lens, said viewing means being mounted in said aperture in said primary mirror.

5. A telescope system as claimed in claim 1 wherein said viewing means comprises an electronic image converter tube having a photo-emissive cathode, an electron lens system and an anode screen, said tube being disposed to have said photo-emissive cathode in said common focal plane, and optical means to observe an image on said anode screen.

6. An infra-red telescope system for simultaneously viewing two superposed images of a same object at different magnifications, comprising first and second optical objective systems having a common focal plane and forming superposed infra-red images of different magnifications in said common focal plane, an electronic infrared image converter tube having a photo-emissive cathode, an electron lens system and an anode screen, said converter tube being disposed to have said cathode in said common focal plane, and optical means to observe an image on said anode screen, said first optical objective system forming the image at the higher magnification comprising in optical alignment, a concave primary mirror having a central aperture receiving said image converter, and a secondary mirror in front of and facing said primary mirror to reflect radiation from said primary mirror to said cathode, said secondary mirror having likewise a central aperture, said second optical objective system forming the image at the lower magnification being a lens system in axial alignment with said first objective system and having its path of rays extending through the aperture in said secondary mirror, the focal length of said first objective system exceeding the focal length of said second objective system by a factor of at least 4 and the relative aperture of said first objective system exceeding the relative aperture of said second objective system by a factor of at least 2.

References Cited in the file of this patent

UNITED STATES PATENTS

| | | |
|---|---|---|
| 2,966,823 | Trimble | Jan. 3, 1961 |
| 3,054,899 | McKnight | Sept. 18, 1962 |

FOREIGN PATENTS

| | | |
|---|---|---|
| 1,087,366 | Germany | Aug. 18, 1960 |